US010086533B2

(12) United States Patent
Finger et al.

(10) Patent No.: US 10,086,533 B2
(45) Date of Patent: Oct. 2, 2018

(54) APPARATUS AND A METHOD FOR PRODUCING OVAL PLASTIC CONTAINERS

(71) Applicant: KRONES AG, Neutraubling (DE)

(72) Inventors: Dieter Finger, Neutraubling (DE); Thomas Kitzinger, Regensburg (DE)

(73) Assignee: KRONES AG, Neutraubling (DE)

( * ) Notice: Subject to any disclaimer, the term of this patent is extended or adjusted under 35 U.S.C. 154(b) by 238 days.

(21) Appl. No.: 15/170,965

(22) Filed: Jun. 2, 2016

(65) Prior Publication Data
US 2016/0361841 A1    Dec. 15, 2016

(30) Foreign Application Priority Data

Jun. 9, 2015    (DE) .................. 10 2015 109 120

(51) Int. Cl.
B29C 49/64    (2006.01)
B29C 31/00    (2006.01)
B29B 13/02    (2006.01)
B29C 49/42    (2006.01)
F27B 13/12    (2006.01)
(Continued)

(52) U.S. Cl.
CPC ............ B29C 31/008 (2013.01); B29B 13/02 (2013.01); B29C 49/4252 (2013.01); B29C 49/6409 (2013.01); B29C 49/6436 (2013.01); F27B 13/12 (2013.01); H05B 6/80 (2013.01); B29C 49/06 (2013.01); B29L 2031/7158 (2013.01)

(58) Field of Classification Search
CPC .................................. B29C 49/6436
See application file for complete search history.

(56) References Cited

U.S. PATENT DOCUMENTS

2009/0092701 A1    4/2009 Schad et al.
2009/0146332 A1    6/2009 Linke
(Continued)

FOREIGN PATENT DOCUMENTS

DE    102008008528 A1    8/2009
DE    102009004819 A1    7/2010
(Continued)

OTHER PUBLICATIONS

Chinese Office Action dated Dec. 1, 2017—Application No. 201610405083.1.
(Continued)

Primary Examiner — Robert B Davis
(74) Attorney, Agent, or Firm — Schmeiser, Olsen & Watts, LLP

(57) ABSTRACT

An apparatus is provided for producing plastic containers, comprising a heating device that heats plastic preforms, and including a shaping device provided downstream of this heating device in the transport direction of the plastic preforms, which shaping device shapes the plastic preforms into the plastic containers, wherein a tempering device for tempering the plastic preforms heated by the heating device is provided in the transport direction of the plastic preforms between the heating device and the shaping device, which tempering device has at least one tempering unit provided on a carrier rotatable about a predetermined rotary axis, and which tempering unit has at least two contacting devices, between which at least one section of the plastic preform can be received, which contacting devices can be moved in relation to one another along a predetermined direction.

11 Claims, 6 Drawing Sheets

(51) Int. Cl.
*H05B 6/80* (2006.01)
*B29L 31/00* (2006.01)
*B29C 49/06* (2006.01)

(56) References Cited

U.S. PATENT DOCUMENTS

2011/0057362 A1 3/2011 Meinzinger
2012/0064184 A1 3/2012 Huettner
2012/0080817 A1 4/2012 Schmitt

FOREIGN PATENT DOCUMENTS

| | | |
|---|---|---|
| DE | 102009021792 A1 | 11/2010 |
| DE | 102010044833 A1 | 3/2012 |
| DE | 102010048211 A1 | 4/2012 |
| EP | 2428347 A2 | 3/2012 |
| JP | H0465217 A | 3/1992 |

OTHER PUBLICATIONS

Chinese Office Action dated Dec. 1, 2017—Application No. 201610404466.7.
Chinese Office Action dated Dec. 1, 2017—Application No. 201610404041.6.

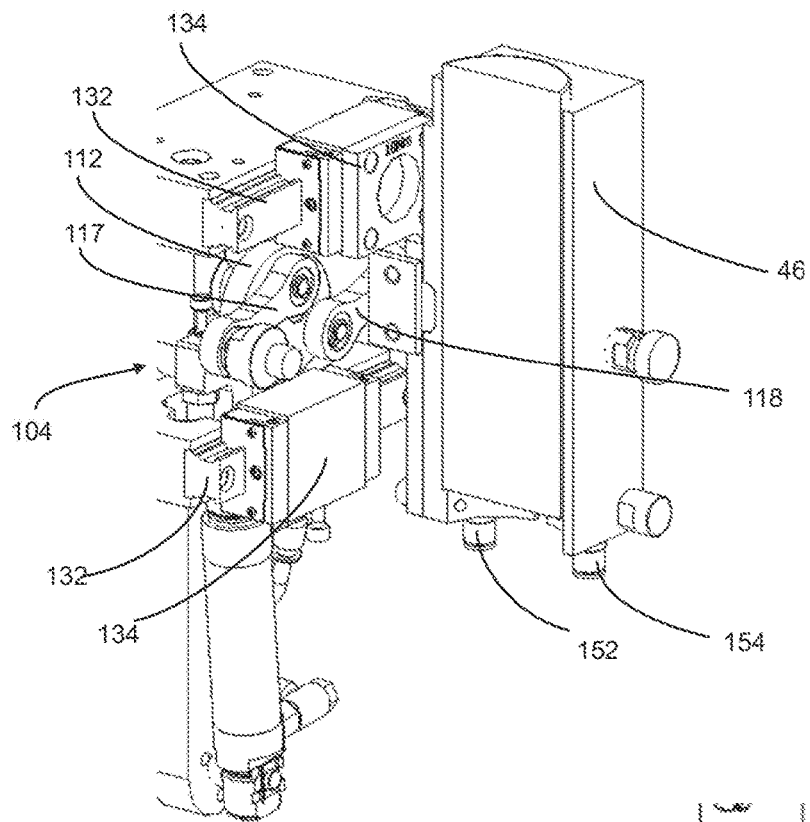
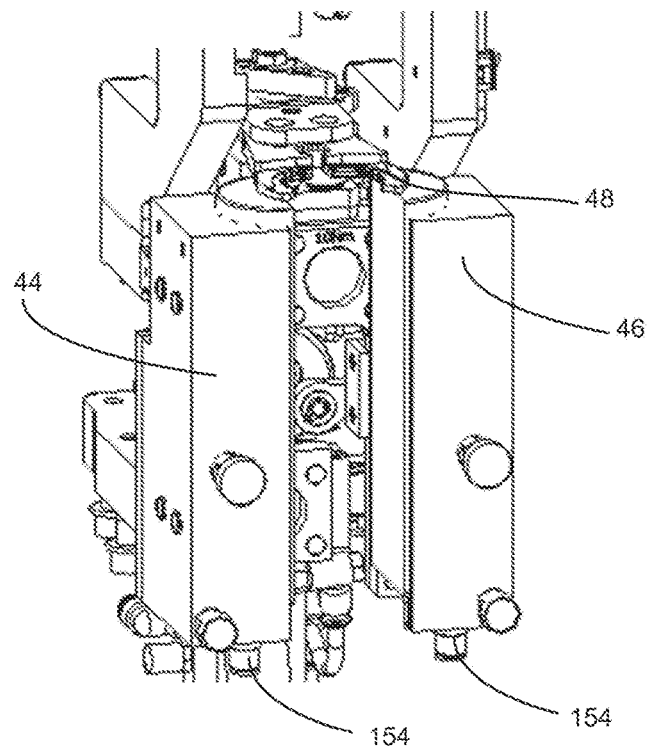
Fig. 12

APPARATUS AND A METHOD FOR PRODUCING OVAL PLASTIC CONTAINERS

CROSS-REFERENCE TO RELATED APPLICATION

This application claims priority to German Application No. 10 2015 109 120.8 having a filing date of Jun. 9, 2015 the entire contents of which are hereby incorporated by reference.

FIELD OF TECHNOLOGY

The following relates to an apparatus and a method for producing plastic containers. Such plastic containers and such methods have been known for a long time. Usually, these containers have a circular cross section. In some situations, however, it may be desired to produce containers that have a different cross section, such as an oval cross section. In this case it is possible to initially heat a plastic preform unevenly and subsequently to expand it in this unevenly heated condition in the circumferential direction using a blow moulding machine such as for example a stretch blow machine. By means of this method, an uneven heating profile is applied to the plastic preform in the circumferential direction.

BACKGROUND

In another approach that has become known through the applicant, the plastic preform is, to start with, evenly heated in an oven and is subsequently tempered differently, for example "cooled", in certain places in a targeted manner. The term "cooling" is here not necessarily understood to mean cooling at a low temperature, but rather a targeted and partial tempering of the preforms at a temperature that is below the temperature the preforms have after having been heated in the oven. This means that the partial tempering is carried out at a temperature that is substantially cooler or lower compared to the temperature of the preforms after having been heated in the oven. In this method, an intermediate module is provided downstream of the heating oven, which partially tempers the plastic preforms by means of embossing plates. More specifically, in the method known from the applicant, the plastic preform is inserted between two embossing plates along the longitudinal direction thereof or vertically. This vertical movement can be achieved via a continuous groove cam. Subsequently, the embossing plates are actuated via a drive device for each station and, if needed, the plastic preform is rotated.

With this approach, different problems arise. To ensure that the plastic preform can be transferred to the apparatus for tempering by a further transport device such as for example a reduction star wheel, the plastic preform is held by this further transport device and a mandrel or, more specifically, a holding mandrel of the actual tempering apparatus is moved into the mouth of the plastic preform. In this way, vertical forces occur during the insertion process, which however are frequently too high for the clamp of the input star wheel.

In order to absorb these vertically occurring forces, stationary support modules are required which can lead to a subsequent twisting of the plastic preform, so that the orientation process of the plastic preform may become incorrect, because a rotary position of the plastic preform is usually detected prior to its input into the station. However, the orientation process itself will only be carried out within the station via a stepper motor. This means, should the preform be accidentally twisted again on its way between the camera inspection and the orientation, the orientation process would be incorrect and the correct rotary position would not be reached. The orientation of the plastic preform or the rotary position thereof is of high significance for the application of the temperature profile onto the required places in a targeted manner. Apart from that, for moving the plastic preform between the embossing plates, the high vertical lift requires a large, complex and expensive lifting cam in the prior art, which causes high loads on the traversing slide. Apart from that, process time is lost as a result of this traversing movement.

A further problem arises partially during the opening and closing movement of the embossing plates (referred to below as contacting device). To this end, pneumatic cylinders are used in the applicant's internal art. Pneumatic cylinders do not ensure a constant and consistent switching time, so that as a rule, a certain scattering occurs between the different treatment stations. The different embossing times or contacting times, in which the embossing plates touch the outer walls of the plastic preforms, reduce the quality of the moulded bottles.

The present invention is therefore based on the aspect of designing the manufacturing process for such non-circular containers in a simpler way. Apart from that, also the possibility is to be provided to reduce deviations between individual treatment stations.

SUMMARY

An aspect relates to producing plastic preforms comprising a heating device that heats plastic preforms, as well as a shaping device that shapes or expands the plastic preforms into the plastic containers and is installed downstream of this heating device in a transport direction of the plastic preforms, wherein in the transport direction of the plastic preforms, a tempering device for (in particular partial and especially partial in the circumferential direction of the plastic preform) tempering of the plastic preforms heated by the heating device is provided between the heating device and the shaping device, and wherein this tempering device has at least one tempering unit provided on a carrier that can be rotated about a predetermined rotary axis, and this tempering unit has at least two contacting devices, between which at least one section of the plastic preforms can be received, and these contacting devices can be moved relative to each other along a predetermined (movement) direction.

According to embodiments of the invention, this predetermined direction of the movement of the contacting devices relative to each other extends at an angle that is different from 0° relative to the radial direction of the carrier. Apart from a tangential movement, also a pivoting movement for opening and closing the contact elements is conceivable.

Heretofore, the contacting devices are orientated such that an opening and closing movement is carried out in a radial direction or in a direction that is perpendicular to the axis of the carrier wheel. So far, this has been designed in a way so as to save space between the individual treatment stations. However, such an opening and closing movement allows the preforms to be introduced into the station exclusively from the top or the bottom, which should be avoided because of the disadvantages mentioned.

Preferably, the contacting devices touch the plastic preform and temper the latter in the circumferential direction thereof in sections or partially. In this way, a certain temperature profile can be generated in a circumferential direction of the plastic preforms, as a result of which the material of the preform will behave differently in these places than in the non-tempered places during the later shaping process. Advantageously, the tempering device includes a plurality of tempering units which are each provided on said carrier. Tempering the plastic preforms is understood here in particular to mean to apply a temperature thereto that differs from the temperature of the plastic preforms after having been heated in the oven. In particular, tempering is a cooling of these sections of the plastic preform. In particular, certain wall sections of the circumferential wall of the plastic preform are tempered. Preferably, the tempering device includes a plurality of tempering units provided on the carrier.

In a further advantageous embodiment, the heating device is an infrared oven that heats the plastic preforms using infrared radiation. However, it would also be possible to use a microwave heating unit. Preferably, this heating device has a transport device for transporting the plastic preforms. Preferably, the heating device includes heating elements that heat the plastic preforms. Particularly preferably, these heating elements are provided to be stationary relative to the transport movement of the plastic preforms.

The above-mentioned relative movement of the one contacting device relative to the other contacting device is understood to mean that at least one contacting device is moved, for example for contacting the plastic preforms, towards the other contacting device. Preferably, however, both contacting devices are moved relative to each other. In particular, this is a uniform movement of both contacting devices. Preferably, the contacting devices are moved along a rectilinear path. This is in particular an opening and closing movement. The contacting devices may however also be pivoted, or the movement could extend along a circular-segmented path.

Preferably, the predetermined direction deviates from said radial direction by at least 10°, preferably by at least 20° and particularly preferably by at least 30°. Preferably, the predetermined direction extends relative to the radial direction at an angle of at least 50°, preferably of at least 60° and preferably of at least 70°. Advantageously, said direction of movement extends tangentially to said carrier on which the heating units are disposed.

Advantageously, this is also a movement that is tangential to a transport movement of the plastic preforms. Advantageously, the plastic preforms are moved along a circular transport path during the application of the heating profile onto the circumferential wall.

In a further advantageous embodiment, the contacting devices contact an outer wall of the plastic preforms. In doing so, these contacting devices preferably cool the outer wall of the plastic preforms. Cooling is here understood to mean cooling in relation to the temperature the plastic preforms have when they exit the oven. This may for example be 120°, and correspondingly the temperature of the contacting device may for example be 50°.

The above-mentioned aspects are therefore correspondingly achieved also by means of a tempering device for tempering plastic preforms, which tempering device has at least one tempering unit that is provided on a carrier that can be rotated about a predetermined rotary axis, and this tempering unit has at least two contacting devices that are suitable and intended for contacting an outer wall of the plastic preforms, and between which at least one section of the plastic preform can be received. These contacting devices are, as mentioned above, movable relative to each other along a predetermined direction.

According to embodiments of the invention, the predetermined direction extends at an angle that is different from 0° relative to a radial direction of the carrier.

In a further advantageous embodiment, the above-mentioned apparatus includes a feeding device that feeds the plastic preforms to the tempering unit or the tempering device, and this feeding device supplies the plastic preforms to the tempering unit or the tempering device in a feeding direction that is substantially perpendicular to a longitudinal direction of the plastic preforms.

The following is further directed to a method for producing plastic containers, wherein plastic preforms are heated by means of a heating device and the plastic preforms thus heated are shaped into the plastic containers by means of a shaping device that is provided downstream of the heating device in a transport direction of the plastic preforms, and the plastic preforms are tempered in sections by means of a tempering device after having been heated by the heating device and prior to the shaping by the shaping device. According to embodiments of the invention, the plastic preforms are fed to the tempering device in a feeding direction that extends in a plane that is substantially perpendicular to a longitudinal direction of the plastic preforms. Preferably, the plastic preforms are transported during the feeding thereof to the tempering device and also during the transport therewith at a constant vertical height.

With this approach, the plastic preform or the plastic container is therefore moved, during the transfer from this feeding device to the heating unit and preferably during the entire passage, substantially without any change to its vertical position. The plastic preform is at least not moved in its vertical direction during the transfer from said feeding device to the tempering unit. However, the plastic preform is preferably moved during its entire treatment (in particular during the heating and the subsequent tempering) and/or its entire passage, i.e. through the heating device, by the feeding device (which may for example be an intermediate star wheel) and the subsequent shaping devices without any change to its vertical position.

Preferably, the tempering device transports the plastic preforms along a circular transport path, and for tempering the plastic preforms, at least two contacting devices are advanced, wherein the advance movement is carried out in a direction that extends in a direction that is different from 0° with regard to a radial direction of this transport path. In particular, this advancement takes place along a direction that includes an angle of at least 20°, preferably of at least 30°, preferably of at least 50° and particularly preferably of at least 70° with the radial direction of the transport path.

Further, as mentioned above, the direction of the opening movement of the contacting devices (or embossing plates) is substantially tangential to the treatment wheel, i.e. to the tempering device. The plastic preform is preferably introduced between the contacting devices substantially perpendicularly to a direction of movement or traverse of the latter. In other words, said feeding device feeds the plastic preforms towards the tempering unit substantially perpendicularly to the predetermined direction in which the contacting devices move. In this way, a particularly accurate transfer may be achieved and, as mentioned, any vertical movement of the plastic preforms can be dispensed with. Preferably, a horizontal plane is formed by the movement direction of the contacting devices on the one hand and the feeding direction in which the plastic preforms are fed to the tempering unit.

In detail, the following method steps are preferably carried out:
- removing the plastic preform from the heating device
- transferring the plastic preform heated by the heating device in a first holding device of a tempering unit of the tempering device, which first holding device is designed as a gripping device
- closing the gripping device of the tempering unit
- vertically introducing a second holding device into the mouth of the plastic preform
- advancing the contacting device towards the plastic preform for tempering the latter
- moving the contacting device away from the plastic preform
- removing the tempered plastic preform via a further transport device
- removing the second holding device from the mouth of the tempered plastic preform.

Within the context of advancing the contacting devices, for example the contacting devices or embossing plates may be closed around the plastic preform. For the purpose of moving the contacting devices away, the embossing plates may correspondingly be opened. The second holding device, which is in particular formed as an internal gripper for the plastic preforms, may also be withdrawn from the mouth thereof at an earlier point in time. Further, a rotation of the plastic preform in relation to its longitudinal axis may optionally be carried out. Within the context of this rotation, the plastic preform may be rotated in relation to its thread position or in relation to an alignment marking of the thread.

In a further embodiment according to the invention, the tempering device for tempering plastic preforms again includes a tempering unit provided on a carrier that can be rotated about a predetermined rotary axis, and this tempering unit has at least two contacting devices that are suitable and intended for contacting an outer wall of the plastic preforms, and between which at least a section of the plastic preform can be received. Further, the apparatus has here a drive device for moving the contacting devices.

According to embodiments of the invention, the drive device has an actuator device that drives and/or moves at least one contacting device. Whilst known guide cams are used that drive and/or move the contacting devices, it is now proposed for the contacting device to have associated therewith an actuator device that generates these movements or that drives the contacting devices.

Advantageously, the tempering device includes a plurality of tempering units and each of these tempering units has an actuator device. In this way, an individual control of the individual actuator devices and thus an individual movement of the individual contacting devices become possible.

Preferably, a movement of the first contacting device is coupled with a movement of the second contacting device by means of at least one coupling device. It is therefore proposed in this embodiment that the movements of the contacting devices are not controlled separately or independently of each other, but that they are coupled together. In this way, a particularly uniform movement can be achieved.

In a further advantageous embodiment, the feeding device includes a rotatable carrier and a plurality of holding devices disposed on this carrier for holding the plastic preforms. In this respect, the feeding device may have for example a plurality of gripping clamps that hold the plastic preforms and are used for transferring the plastic preforms to the tempering units. These holding devices may for example be gripping clamps that carry the plastic preforms in a predetermined region, for example below a so-called carrier ring.

Preferably, these holding devices are mounted so as to be movable in their entirety in relation to the carrier of the feeding devices, for example on a pivotable arm, and are, if necessary, also movable in a radial direction of this carrier. Advantageously, this feeding device is a so-called reduction star wheel that is used and intended for changing a separation of the individual plastic preforms on the transport path from the heating device to the tempering device. Usually, the plastic preforms are transported in the heating device at a distance that is much smaller than in the tempering device. The reduction star wheel is used for changing this distance.

In a further advantageous embodiment, the tempering device has at least one first holding device for holding the plastic preforms and in particular a plurality of holding devices for holding the plastic preforms. In particular, each tempering unit has here associated therewith such a holding device for holding the plastic preforms. In particular, this is a gripping clamp that grips the plastic preform by the external surface thereof and in particular on or below the thread thereof, and holds it in this way. The apparatus known do not have such a gripping device. In this context, the plastic preform has so far usually been transferred by the gripping device to the feeding device, such as the reduction star wheel, on a holding mandrel of the tempering device.

It is proposed within the scope of the present apparatus that the plastic preform is taken out of the heating device via an intermediate star wheel, such as for example a reduction star wheel, and is transferred via the latter to said gripping device of the tempering unit, for example on a clamp located on the embossing station. In this way, the plastic preform may already be located in a target position and only afterwards is it possible that for example a mandrel of the tempering unit engages in a mouth of the plastic preform. Preferably, each tempering unit has associated therewith both a first holding device, in particular in the form of said gripping clamp, and a second holding device, in particular in the form of a holding mandrel. Advantageously, these two holding devices hold the plastic preform together, at least temporally.

Preferably, as mentioned, a movement of the first contacting device is coupled with a movement of the second contacting device. In this context, the apparatus in particular includes a mechanical coupling device. Also the use of an electronic coupling would be conceivable, for example a control-side coupling that controls the drives of two contacting devices. Preferably however, said mechanical coupling device is provided. In this context, for example as described in more detail below, this coupling can be realised via a linkage. In this embodiment it is possible to provide only one actuator or one drive device, and said coupling device transfers the movement of this actuator to both contacting devices. This coupling makes it possible for both contacting devices to move substantially at the same time and in particular also in a rectilinear manner, in particular a movement is conceivable that ensures that a geometrical centre between the two contacting devices remains constant during the advance movement of the contacting devices towards each other. Advantageously, also a longitudinal axis of the plastic preform is located in this geometrical plane or in this geometrical centre. In this way, the two contacting devices may be uniformly advanced towards the plastic preforms (or be removed therefrom).

In a further advantageous embodiment, the tempering unit has a rotary device for rotating the plastic preforms in respect of the longitudinal direction thereof. This rotary device may here include a further holding element that holds the plastic preform. This further holding element or this further holding device may in particular be a mandrel that engages in a mouth of the plastic preform. In the course of this process, the plastic preform can initially be held by the gripping clamp, subsequently said mandrel can engage in the plastic preform and can effect in this way (in particular after the gripping clamp has been opened) also a rotation about the longitudinal direction thereof.

In a further advantageous embodiment, the diameters of this internal gripping for the plastic preform of the clamp for holding the plastic preforms and also the diameters of the contacting devices are located coaxially on top of each other. In this way it can be achieved that in the case of individual transfers, and also during the tempering of the plastic preform, no forces acting in the direction perpendicular to the longitudinal direction of the plastic preform occur.

Preferably, the apparatus includes a second holding device for holding the plastic preforms, which can be inserted into the mouth of a plastic preform.

In a further advantageous embodiment, the apparatus includes a rotary position detection device that detects a rotary position of the plastic preforms in relation to the longitudinal directions thereof (in particular in a contactless manner). This may for example be an optical detection device that detects a certain marking of the plastic preform and detects, by means of the position of this marking, the rotary position of the plastic preform. This marking is here preferably located in a certain place on the external circumference that is characteristic of a rotary position of a thread of the plastic preform. As a response to the rotary position thus detected, the rotary position of the plastic preform may be adjusted.

This means, whilst in the related art the plastic preforms are transferred directly from the feeding device to the holding mandrel, in the context of embodiments of the invention, it is also advantageously proposed that the plastic preforms are initially transferred to a holding device or a gripping clamp, which is in each case associated with the individual tempering units.

In a further advantageous embodiment, the apparatus has an actuator device that effects both the movement of the first contacting device and the movement of the second contacting device. This actuator device or drive device may for example be an electric motor, however, it would also be conceivable to use pneumatic, hydraulic or magnetic drives. Also a guide cam would be conceivable as a drive device. In other words, the actuator device is selected from a group of actuator devices that includes electrically operated actuator devices, hydraulically operated actuator devices, pneumatically operated actuator devices and/or magnetically operated actuator devices.

In a further advantageous embodiment, the movements of the two contacting devices are coupled via a mechanical linkage. This linkage may here, as will be explained in more detail below, be articulated to a rotatable body. Thus, it would for example be possible for the actuator device to carry out a translatory traversing movement, which is translated via the linkage into a rotary movement and/or into a further translatory movement of the other contacting device. Apart from that, it would also be possible for the translatory traversing movement of the contacting devices to be derived from a rotary movement. Apart from that it would also be conceivable that the translatory traversing movement of the two contacting devices is derived directly from a rotation of an actuator device, for example of an electric motor.

As has already been mentioned above, this kinematic is preferably designed in such a way that the contacting devices or the receptacles for the contacting devices move tangentially to a main rotary direction of the receptacle wheel or of the carrier, and particularly preferably, the movement of the two contacting devices is realised in the opposite direction towards a centre. In this way, a uniform advance movement of the contacting devices towards the plastic preform is conceivable.

In a further advantageous embodiment, the apparatus has a stop or a stop device, which defines a limit position of the contacting elements. Thus for example, a stop may be located on the receptacle devices for the contacting device, which defines a central position of the contacting devices and particularly preferably also limits the force acting on the plastic preform.

In a further advantageous embodiment it would be conceivable that the contacting devices can be removed from the carrier associated therewith even in a longitudinal direction of the plastic preform.

In a further advantageous embodiment, the actuator device is located on a slide. Thus for example, also a linear motor could be used as an actuator device.

In a further advantageous embodiment, the coupling device has at least one rod-shaped body, via which a contacting device is articulated. Thus for example, the contacting device may be articulated to a rotatable element via the rod-shaped body.

In a further advantageous embodiment, the coupling device has a rotatable carrier, to which the contacting devices are articulated via the linkage. As will be explained in more detail below, such an articulation may also allow a uniform advance movement to be achieved.

In a further advantageous embodiment, the apparatus or the tempering device has a first holding device for holding the plastic preforms. Advantageously, as mentioned above, the tempering device also includes a second holding device for holding the plastic preforms. Advantageously here, one of these holding devices may be formed as a gripping clamp, the other one as a holding mandrel.

Preferably, an electric drive device may here be provided for the gripping clamp, which effects an opening and closing movement of this gripping device. Advantageously, the first holding device is therefore switchable, i.e. this is in particular an active holding device or an active gripping clamp that can be switched and in this way closed and opened.

In a further advantageous embodiment, the coupling device couples the movement of the first contacting device to the movement of the second contacting device in such a way that the first contacting device and the second contacting device move (in particular uniformly) in opposite directions. This movement may here be an advance movement towards the plastic preform, but it may also be a movement away from the plastic preform. Preferably, these are here rectilinear movements.

As mentioned above, the tempering unit preferably includes a rotary device for rotating the plastic preforms in respect of the longitudinal directions thereof. This rotary device may in particular, but not exclusively, be a stepper motor.

In a further advantageous embodiment, the coupling device is provided within a transport path, along which the plastic preforms are transported by means of the tempering unit. Advantageously, this transport path is, as mentioned above, a circular transport path. Preferably, also the actuator devices are provided within this transport path. Thus for example, the actuator devices may, compared with a pitch circle of the treatment wheel, i.e. the circle on which the plastic preforms are transported during the tempering thereof, be placed on a circle having a smaller diameter.

In a further advantageous embodiment, at least one contacting device and preferably both contacting devices may have a flowable and in particular a liquid tempering medium flowing through them. Thus, channels may be provided on the inside of these contacting devices, through which a tempering medium can flow. By means of this tempering medium, the contacting devices can be maintained at a certain temperature level, for example at 50° C.

In a further preferred embodiment, said holding device for the plastic preforms may be located above the contacting devices. Here, this holding device may be actively switchable.

In a further advantageous embodiment, the contacting devices are each provided on carriers, and particularly preferably, they are held on these carriers by a force- and/or form-locking connection.

In a further advantageous embodiment, the movements of the first contacting devices and of the second contacting device are coupled in such a way that the contacting devices move in a direction that includes an angle that is different from 0° with a radial direction of the main carrier. In particular, this is a direction that is substantially tangential to the main rotary direction of the plastic preforms, as mentioned above.

In a further advantageous embodiment, an opening lift between the contacting devices is smaller than 70 mm, preferably smaller than 60 mm and particularly preferably smaller than 55 mm. This opening lift is sufficient for introducing a plastic preform between the contacting devices perpendicularly to the longitudinal direction thereof. As mentioned above, the plastic preform is preferably introduced between the contacting devices perpendicularly to the longitudinal direction thereof.

The following is further directed to a tempering device for tempering plastic preforms, which tempering device has at least one tempering unit provided on a carrier that is rotatable about a predetermined rotary axis, and this tempering unit has at least two contacting devices that are suitable and intended for contacting an outer wall of the plastic preform, and between which at least a section of the plastic preforms can be received. Further, this contacting device includes a drive device for moving the contacting devices in a predetermined direction of movement.

According to embodiments of the invention, the apparatus includes a detection device in order to detect, at least temporally, a position of at least one contacting device in the predetermined direction of movement.

As mentioned above, an opening and closing movement of the contacting device may be carried out via a control using pneumatic cylinders. In the case of pneumatic cylinders, as mentioned above, no constant and consistent switching time can be ensured, and for this reason a scattering of the treatment times between the individual treatment stations has to be expected. In order to counteract such scattering it is proposed to measure the opening and closing times and to detect the position of the embossing plates. To this end, it would be possible to detect a position of the contacting devices via a detection device. In this way, the movement can be controlled.

Advantageously, a plurality of tempering units is provided on the carrier and each tempering unit has a detection device in order to detect, at least temporally, a position of at least one contacting device in the direction of movement. In other words, the relative position of the contacting device in relation to the plastic preform to be tempered is preferably detected.

In a further advantageous embodiment, the apparatus includes a control device in order to control the drive device as a function of the detected position of the at least one contacting device. In particular, a control of the contacting device (in particular the movement thereof) or a control of this drive device is carried out.

In a further advantageous embodiment, the drive device is a pneumatic drive device. However, also hydraulic, magnetic or electric drive devices would be conceivable.

In a further advantageous embodiment, the tempering device includes a time measurement device. Preferably, the time measurement device is suitable and intended for detecting a temporal distance between a first signal that is characteristic of the control of the drive device and a second signal that is characteristic of a position of the contacting device.

In this embodiment it is possible for the position of the contacting device to be polled via a detection device such as for example a proximity switch. In each individual heating unit, the time between the electrical switch signal and an actuation of the detection device, in particular a proximity switch, can be measured, particularly preferably independently of each other during closing and during opening. A rising edge of the valve control of the pneumatic drive device may be present here until the contact devices are closed, and a falling edge of the valve control may be present until the contacting devices are opened. During the next passage of the contacting device or of the tempering unit, the measured times may be calculated in as a reference value or as a lead value. This means that the control signal will be output earlier than the desired target time by the measured time. In this way, the individual station values can be adapted to each other, so that the contacting of the plastic preforms will always be carried out in exactly the same way.

Apart from that, again also a measurement can be carried out which will then in turn be used for the next cycle. In this way, a slow drifting away, which may occur for example during a running-in period, may be compensated.

In addition it would be possible that in a special running-in process, which is carried out for example after a prolonged standstill period of the system, the contacting device can be operated in an empty condition for one cycle even before the input of the first plastic preform, and the delay times may be measured. In this way, the circumstance may be taken into account that the last measurement is a long time back and the times might have changed too much during a standby operation.

Preferably here too, a movement of the first contacting device is coupled with a movement of the second contacting device by means of a coupling device. As mentioned, the coupling device may here again be a mechanical coupling device.

The following is further directed to a method for treating containers and in particular for treating plastic containers. Here, a plurality of substantially similar treatment stations is provided, which treat the containers substantially in the same way using at least one treatment element. Further, in each case the at least one treatment element is moved relative to the container to be treated by means of pneumatic drives that are each associated with the respective treatment stations. According to embodiments of the invention, at least one value is detected by means of a detection device, which is characteristic of a geometric position of the treatment element relative to the container, and/or at least one first time value is determined that is characteristic of reaching a geometric position of the treatment element in relation to the container, and on the basis of this measured value, the pneumatic drive is controlled.

Therefore, it is also proposed on the side of the method that the pneumatic drive is open-loop controlled and in particular closed-loop controlled, namely in particular on the basis of values that were determined for exactly this treatment element. Preferably, the drive is closed-loop controlled, and particularly preferably on the basis of a first measured value, a change to the drive or to a drive parameter is carried out, and preferably said values are again determined in a further cycle.

The concept described here can be used in particular for adapting the parameters of a plurality of treatment elements to each other, so that in all treatment stations, container treatment steps of substantially the same type are carried out.

The following is here in particular described again in the light of the contacting devices already described above, however it is pointed out that the concept described here can also be used on other machines, in which the containers are treated using treatment elements, for example heating devices, shaping devices or filling devices. The containers may be both plastic preforms and plastic containers such as plastic bottles.

Preferably, therefore, the time values of a plurality of treatment stations are measured and the pneumatic drives of the individual treatment stations are controlled in such a way that the treatment times of the respective containers with the respective treatment elements for the individual treatment stations are matched to each other.

In a further preferred method, the measured values for the positions and/or the time values are stored.

In a further preferred method, a switching point of at least one valve of the pneumatic drive device is controlled. Particularly preferably, the switching points of the individual valves of the pneumatic drive devices of the individual treatment stations are controlled and adapted to each other in particular in such a way that a consistent treatment of the respective containers using the individual treatment units is carried out.

In a further preferred embodiment, the treatment element is a contacting device that contacts a plastic preform for the tempering thereof. In the method described here, the contacting times of the individual plastic preforms with the contacting devices can be matched to each other, and in this way a consistent tempering of the plastic preforms can be carried out.

BRIEF DESCRIPTION

Some of the embodiments will be described in detail, with reference to the following figures, wherein like designations denote like members, wherein:

FIG. 11 shows a further detailed view of a treatment device; and

FIG. 12 shows a further detailed view of a treatment device.

DETAILED DESCRIPTION

Figure 1:
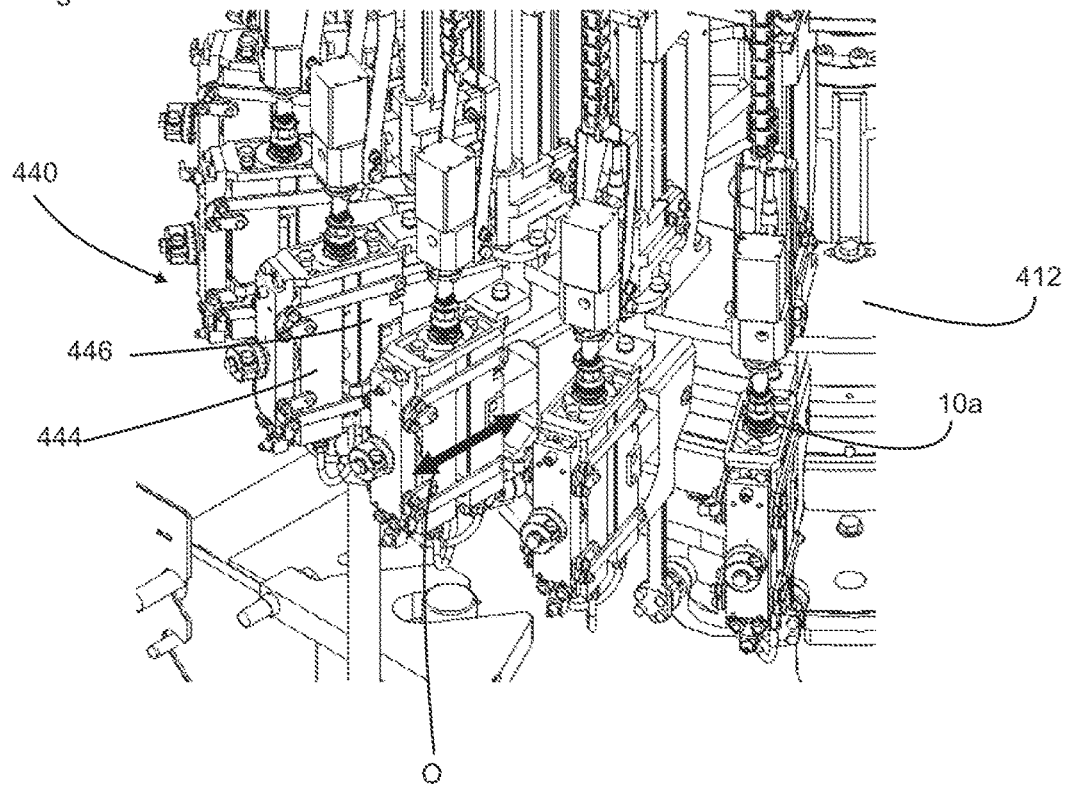
FIG. 1 shows a detailed view of a treatment device.

FIG. 1 shows an apparatus for tempering containers and in particular plastic preforms according to the related art. This apparatus includes here a rotatable carrier 412, on which a plurality of treatment units 440 is provided. These treatment units each have a first contacting device 444 and a second contacting device 446, which are suitable and intended for contacting a plastic preform, of which here only a thread 10a can be seen, on the outer wall thereof. These contacting devices 444, 446 may here have walls, which can be placed against certain regions of the plastic preforms, in order to temper the latter and in particular to cool them in relation to the temperature the plastic preforms have when they exit an oven. In this context, the plastic preform is pushed between the two contacting devices 444 and 446 along the longitudinal direction thereof, i.e. the plastic preforms are vertically lifted. Further, the contacting devices 444, 446 are pushed apart in the radial direction of the carrier 412, which is illustrated by the arrow O. After this opening, the plastic preform is inserted and the contacting devices are advanced towards the plastic preform.

Figure 2:
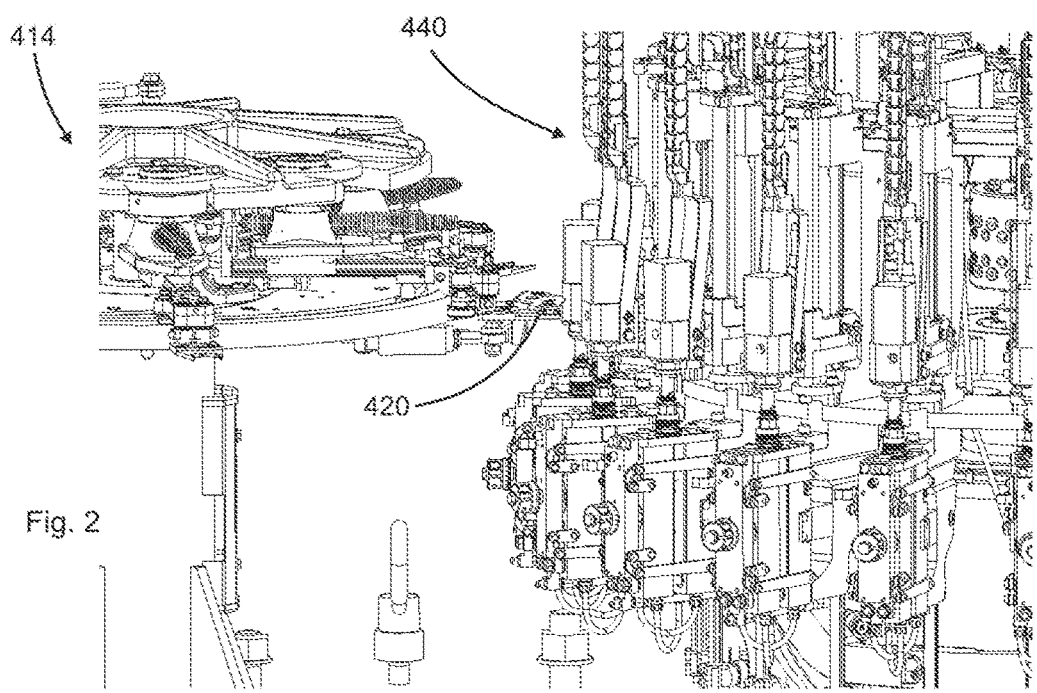
FIG. 2 shows a view for feeding plastic preforms to a treatment device.

FIG. 2 illustrates the entire process. It can be seen here that the plastic preforms are fed by a gripping clamp 420 of a feeding device 414 directly to the individual treatment units. More specifically, the heated plastic preform is transferred, via the feeding device 414 or the reduction star wheel 414, directly to the internal gripper of the individual treatment units and is subsequently displaced downwards in the longitudinal direction thereof.

Figure 3:
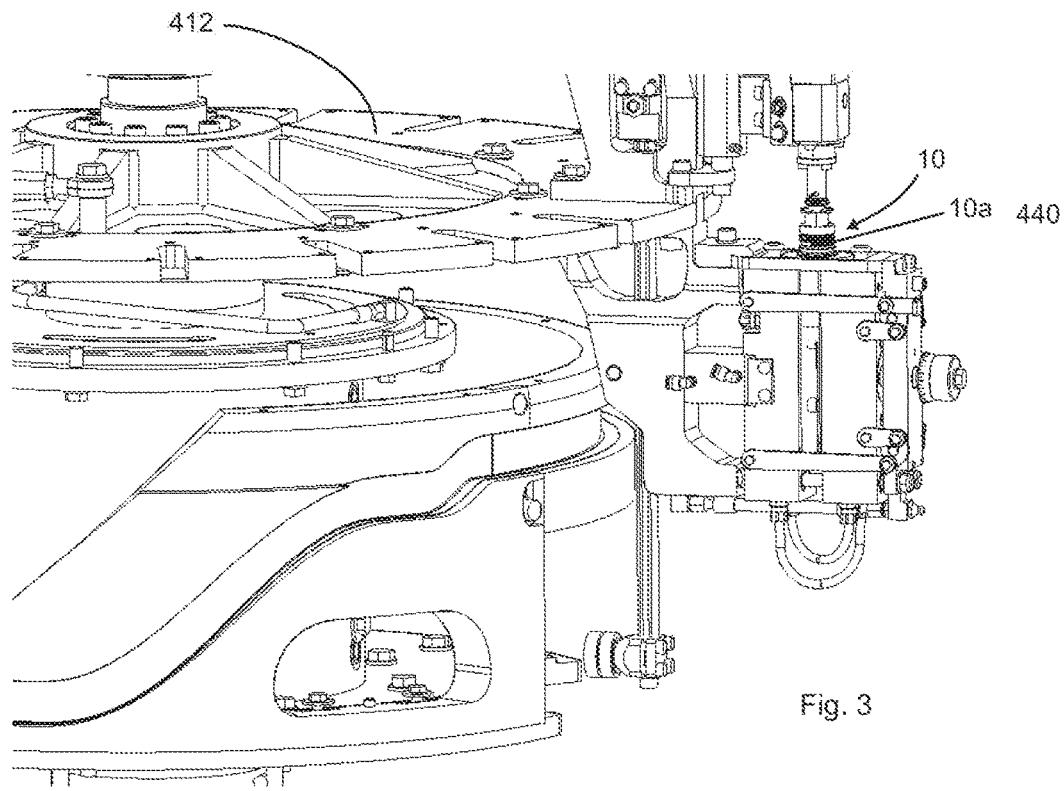
FIG. 3 shows a lateral view of the treatment device shown in FIG. 1.

FIG. 3 shows a further detailed view of a corresponding apparatus according to the related art. What can be seen here again is the plastic preform 10 or the mouth 10a thereof, which protrudes from the tempering unit 440. It can be seen that the contacting devices are here opened and closed in the radial direction thereof.

Figure 4:
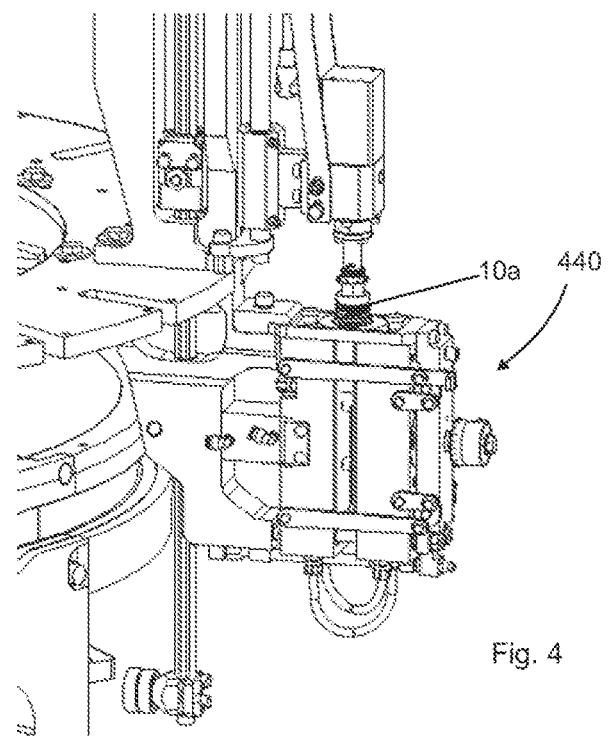
FIG. 4 shows a further view of the treatment device.

FIG. 4 shows a correspondingly enlarged view. In particular, it can be seen in this view that the treatment units do not have their own gripping element for holding the plastic preforms, but that the holding of the plastic preforms is carried out merely via the internal gripper that engages in the mouth 10a of the plastic preforms.

Figure 5:
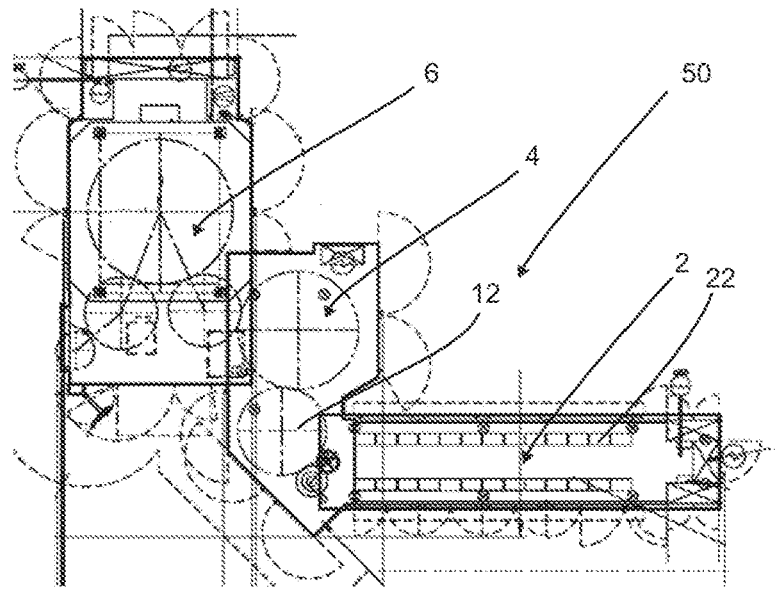
FIG. 5 shows a view of an entire system for treating plastic containers.

FIG. 5 shows an illustration of a system 50 for treating containers. This has here a heating device 2, such as an oven, through which the plastic preforms are passed. Subsequently, the plastic preforms are transferred to the tempering device 4 by means of a transfer star wheel, and from there in turn, in the tempered condition, to a shaping device 6, for example a blow moulding machine. In this blow moulding machine, containers are here shaped or stretch-blown so as to have a cross section that deviates from a circular cross section.

Figure 6:
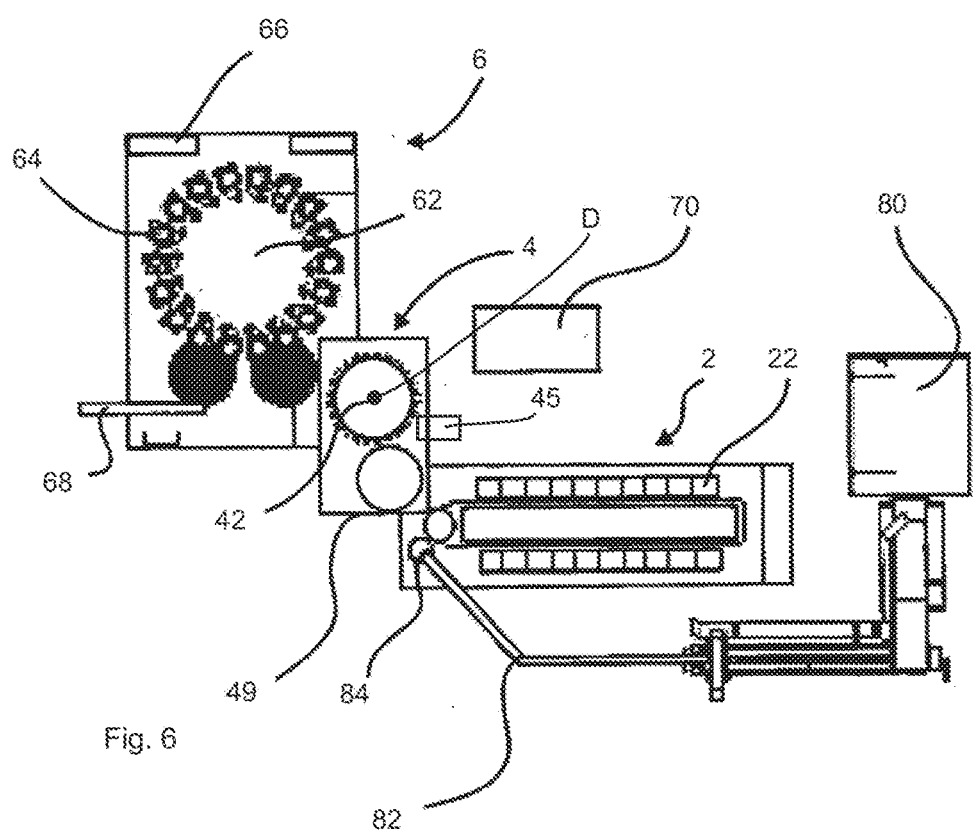
FIG. 6 shows a further view of a system for treating containers.

FIG. 6 shows a further, more accurate view of a system 50 for producing plastic containers. In this system 50, the plastic preforms are also initially made by means of a production device 80 and are subsequently fed to the heating device 2 via a feeding device 82 and a so-called synchronisation star 84. The synchronisation star separates the individual plastic preforms or forms a predetermined pitch between them. This heating device 2 has a plurality of heating elements 22, which are here mounted to be stationary and along which the plastic preforms are passed. In the course of this, all of the plastic preforms are consistently heated.

Reference numeral 12 identifies a feeding device that transfers the plastic preforms to the tempering device 4. This feeding device 12 is, as mentioned above, a so-called reduction star wheel. The tempering device has a carrier that can be rotated about a rotary axis D, on which a plurality of tempering units is provided. Reference numeral 49 identifies a housing surrounding the tempering device 4. The shaping device 6 also has a rotatable carrier 62, on which a plurality of shaping stations 64 is provided. Reference numeral 66 identifies a control device for controlling the shaping device 6, and reference numeral 68 identifies a discharge device for discharging the finished containers. Reference numeral 70 identifies a control device for controlling the heating device 4. Reference numeral 45 identifies a rotary position detection device that detects a rotary position of the plastic preforms in respect of the longitudinal direction thereof.

Figure 7:
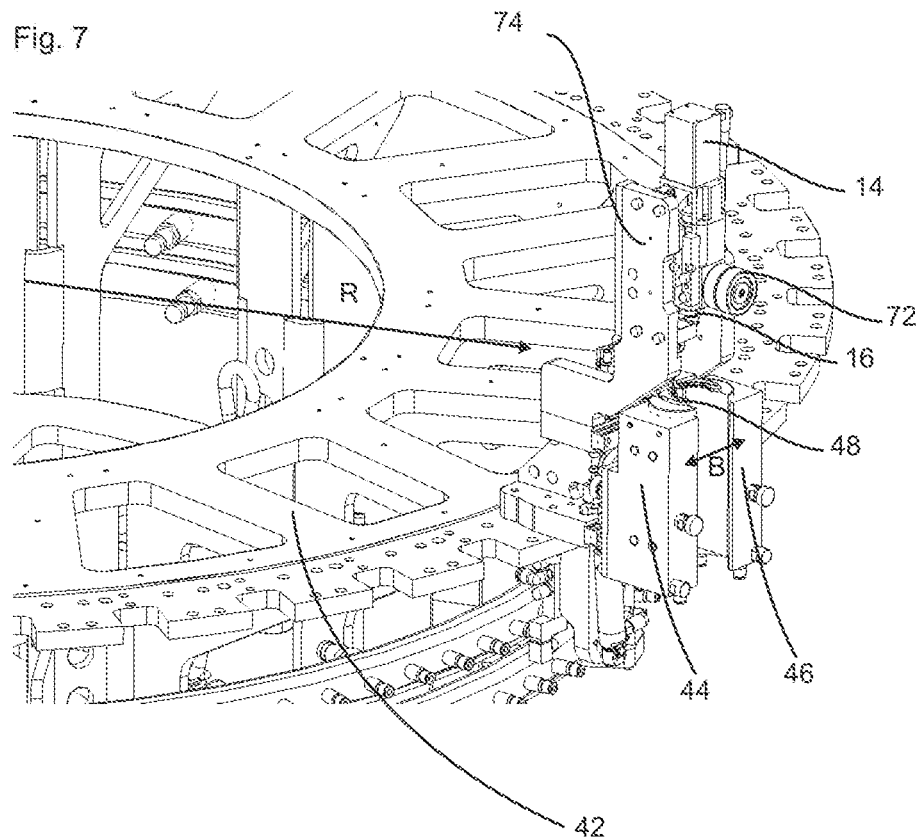
FIG. 7 shows a view of a treatment device.

FIG. 7 shows a view of an apparatus according to embodiments of the invention for tempering plastic preforms. This apparatus, too, has here two contacting devices 44 and 46, however, an advance movement is carried out along the arrow B, which is here substantially perpendicular to a radial direction R of the carrier 42, on which the heating unit 40 is provided. Reference numeral 48 identifies a holding device, such as here a gripping clamp, which is used for gripping the plastic preform. During the tempering process therefore, the plastic preform is also held by this gripping clamp 48. This gripping clamp 48 is provided to be stationary relative to the carrier 42 or to be stationary apart from its actual gripping movement.

The plastic preform is input into this gripping device 48 and is held thereby, until a holding mandrel 16 (i.e. the second holding device) has been introduced into the mouth of this plastic preform. The plastic preform is rotated, if necessary, in respect of the longitudinal direction thereof, in order to orientate the thread, and subsequently the contacting devices 44 and 46 are uniformly advanced to the plastic preform, in order to temper the latter on the outer circumference or the outer wall thereof. For the purpose of introducing the second holding device into the mouth of the plastic preform, a guide roller 72 is provided, which causes the second holding device 16 to be advanced towards the plastic preform.

Reference numeral 74 identifies a carrier, on which the second holding device 16 is provided. Reference numeral 14 identifies a rotary device, such as a stepper motor, which is used for rotating the plastic preform 10 in respect of the longitudinal axis thereof. By means of this rotary device 14, an orientation of the individual threads of the plastic preforms can be achieved.

In the method, the plastic preform is initially introduced into the first holding device 48 in a horizontal direction, and subsequently, also the second holding device 16 is introduced into the mouth of the plastic preform. Also a rotary position of the thread of the plastic preform may be detected after the transfer thereof into the first holding device 48. In this position, the plastic preform can then be rotated in respect of the longitudinal direction thereof. After the tempering, the plastic preform is again removed from the holding device 48 via an intermediate star wheel (not shown). Thus, the holding device 48 is an active element that can therefore be actively opened and closed. An opening can be carried out for example in order to rotate the plastic preform in respect of the longitudinal direction thereof.

Preferably, the plastic preform is input into the tempering device in such a way that a (circumferential) angle of more than 250°, preferably more than 270° and particularly preferably of more than 290° is achieved between the discharge point and the input point. In other words, the plastic preform is transported about the mentioned circumferential angle between the input point and the discharge point. Along this process angle, a tempering of the plastic preform is thus carried out. As a result of this comparatively large process angle, a substantially consistent tempering of all the plastic preforms can be facilitated.

In detail, the plastic preform is initially removed from the oven shown in FIGS. 5 and 6, and this is preferably carried out by means of a reduction star wheel. Subsequently, the heated plastic preform is passed from this reduction star wheel into the first holding device 48 which, as mentioned above, is provided on the carrier 42 and above the two contacting devices 44 and 46. Subsequently, the holding device 48 is closed in order to hold the plastic preform 10. In a further method step, the second holding device 16 is moved into the mouth of the plastic preform, and this movement is carried out in a vertical direction (i.e. in the longitudinal direction of the plastic preform). Subsequently, the holding device 48 is opened, so that the plastic preform is held only by the second holding device 16. If required, the plastic preform is rotated in correspondence with its orientation marking. In this way, accurately predefined regions of the circumferential wall of the plastic preform may be tempered.

In a further method step, the two contacting devices 44 and 46 are closed and temper regions of the outer wall of the plastic preform.

In a further method step, the contacting devices 44, 46 are opened again and the plastic preform thus provided with a temperature profile is removed by a removal device, which is in particular again a reduction star wheel, of the tempering device. Subsequently, the plastic preform is transferred to the shaping device 6 shown above. Prior to the removal of the plastic preform, the holding device 16 can here be withdrawn again from the mouth of the plastic preform. Correspondingly, the clamp 48 can here also be closed again, so that again a purely horizontal transfer of the plastic preform to the subsequent transport devices is possible.

Reference sign B relates to the direction of movement of the two contacting devices 44, 46. It can be seen that this direction of movement B is here perpendicular to the radial direction R of the carrier 42. In other words, the movement direction B extends here tangentially to the transport path of the plastic preforms 10. However, it would also be possible to position the two contacting devices 44, 46 somewhat obliquely, so that the plastic preform can be introduced between the contacting devices in its transport direction "from behind".

Figure 8:
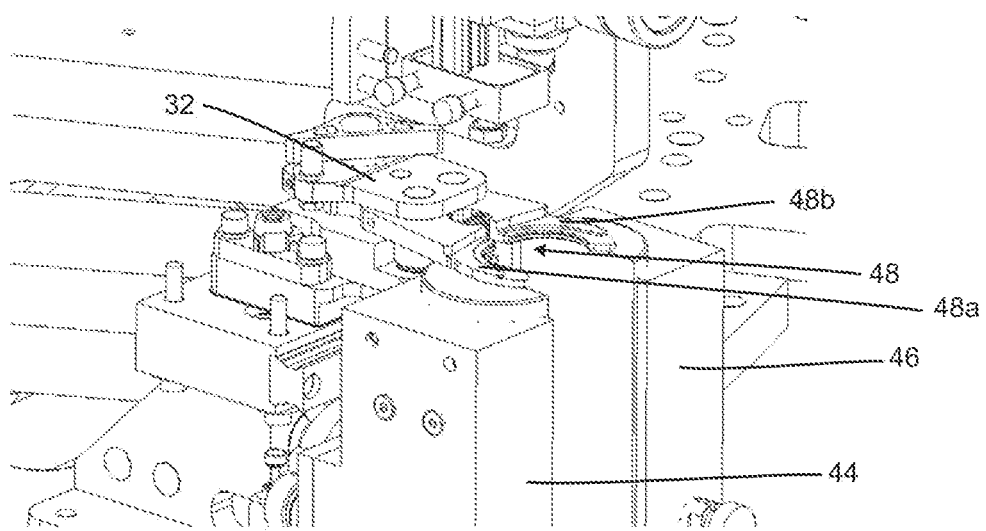
FIG. 8 shows a detailed view of the treatment device shown in FIG. 7.

FIG. 8 shows a detailed view of the apparatus shown in FIG. 7. It can be seen that the gripping device 48 has two clamp parts 48*a* and 48*b*. Reference numeral 32 schematically identifies a drive that is used for opening and closing the gripping device 48. This clamp 48 is here located in its entirety above the contacting devices 44 and 46. More specifically, a carrier of this gripping clamp 48 is provided to be stationary relative to a carrier of the two contacting devices 44 and 46.

Figure 9:
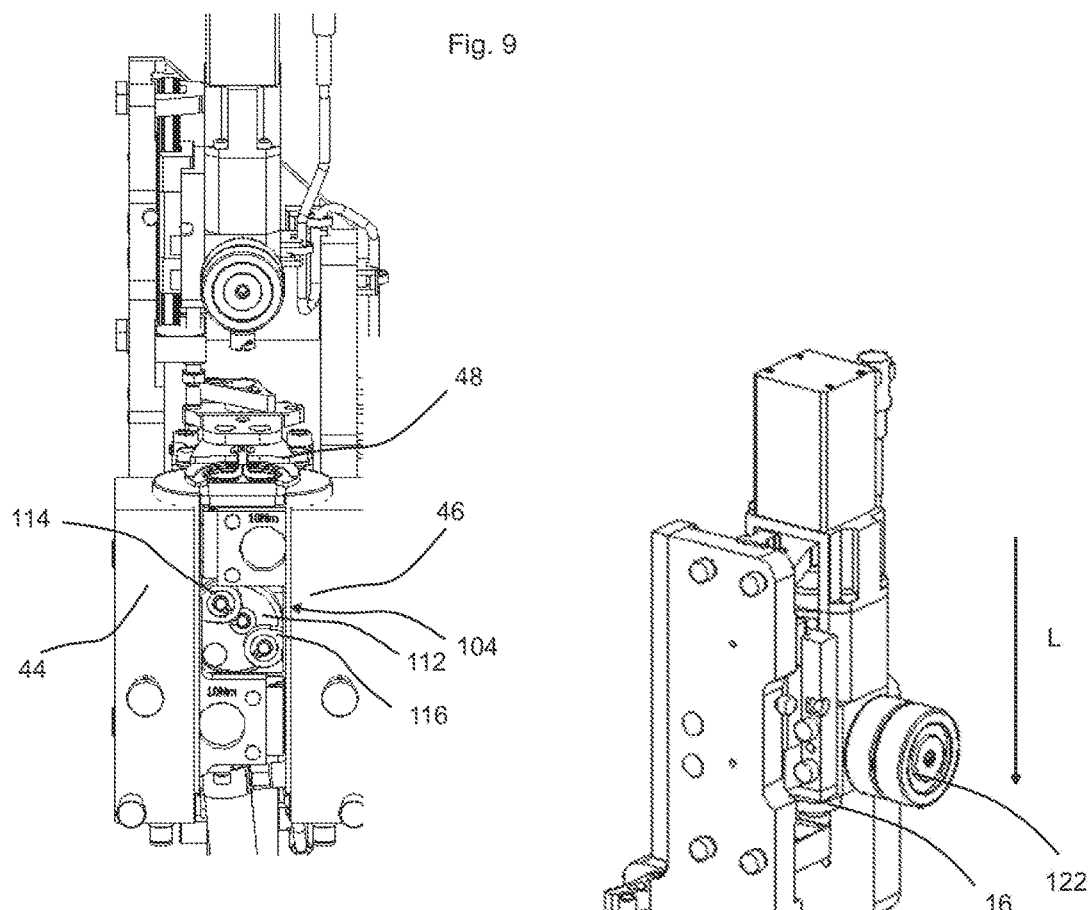
FIG. 9 shows a front view of the treatment device shown in FIG. 7.

FIG. 9 shows a front view of the apparatus according to embodiments of the invention. Here, too, the two contacting devices 44 and 46 as well as the gripping clamp 48 can be seen. Apart from that, also a coupling device is provided, which is in its entirety identified with 104 and which couples the movement of the first contacting device 44 with the movement of the second contacting device 46. This coupling device 104 has here a rotatable carrier 112, to which the two hinge joints 114 and 116 are articulated. These two hinge joints 114 and 116 are in turn connected to the contacting devices 44 and 46 via a linkage (not shown here). It would be possible here for the rotatable carrier 112 to be driven by an electric motor, so that the contacting devices 44 and 46 are uniformly moved apart and together via the linkage. However, it would also be possible to drive one of the two contacting devices 44, 46 by means of a linear motor, and the coupling device 104 would transmit this movement also to the other contacting device.

Figure 10:
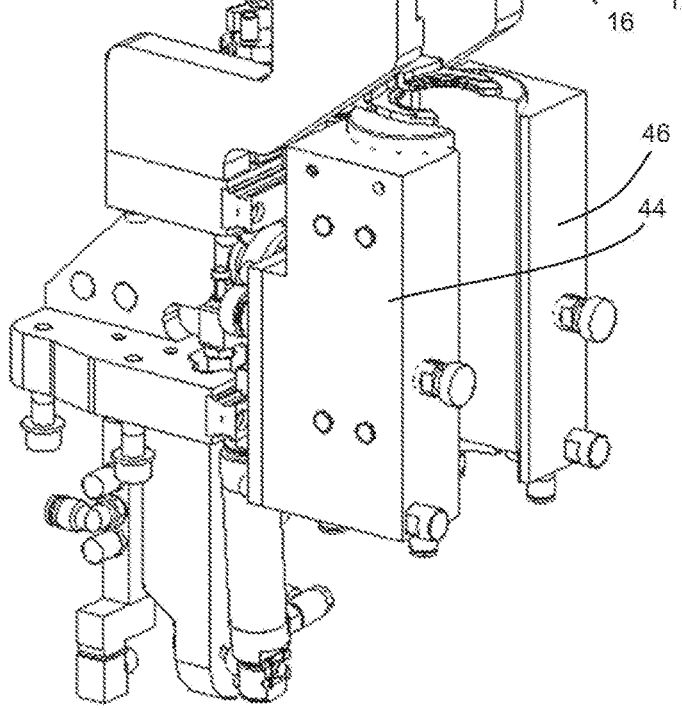
FIG. 10 shows a further detailed view of a treatment device.

FIG. 10 shows a further view of a heating unit according to embodiments of the invention. Here, too, the second holding device 16 can be seen, which in this case is a mandrel that can be introduced into the mouth of a plastic preform (not shown). This holding device can here be moved in the longitudinal direction L of the plastic preform, in order to allow, as mentioned, the introduction thereof into the plastic preform or the mouth thereof.

Reference numeral 122 identifies a guide roller that rolls off on a guide cam (not shown), in order to achieve in this way the introduction of the holding device 16 into the plastic preform.

FIG. 11 shows a further partial view of the coupling device 104. Here, also the two rod-shaped bodies 117 and 118 are shown, via which the two contacting devices 44 (not shown) and 46 are articulated. Reference numerals 132 each identify a carrier, on which a slide 134 is displaceably supported. On this slide, in turn, the contacting device 46 is provided. This slide may also have a (linear motor) drive for moving the contacting device 46.

Reference numerals 152 and 154 relate to connections, by means of which a flowable medium can be fed to the contacting device 46, in order to temper the contacting device 46. Correspondingly, the contacting device 46 has channels on the inside thereof for conducting this liquid medium.

FIG. 12 again shows a front view of a heating unit according to embodiments of the invention. Here, again, the two contacting devices 44 and 46 can be seen, as well as a connection 154 for feeding and discharging the flowable tempering medium.

The applicant reserves the right to claim all of the features disclosed in the application documents as being essential to embodiments of the invention, in as far as they are novel over the related art either individually or in combination. It is further pointed out that the individual figures also describe features which, by themselves, may be advantageous. A person skilled in the art will immediately realise that a certain feature described in a figure may be advantageous, even if no further features from this figure are adopted. A person skilled in the art will further realise that advantages may also result from a combination of a plurality of features shown in individual or in different figures.

LIST OF REFERENCE NUMERALS

1 Apparatus
2 Heating device
4 Tempering device/Heating device
6 Shaping device
10 Plastic preform
10*a* Thread/Mouth
12 Feeding device
14 Rotating device
16 Second holding device
22 Heating elements
32 Drive
42 Carrier
44, 46 Contacting Devices
45 Rotary position detection device
48 Holding device/Gripping clamp
48*a, b* Clamp parts
49 Housing
50 System
62 Carrier
64 Shaping station
66 Control device
68 Discharge device
70 Control device
72 Guide roller
74 Carrier
80 Production device
82 Feeding device
84 Synchronisation star
104 Coupling device
112 Rotatable carrier
114, 116 Hinge joints
117, 118 Rod-shaped body
122 Guide roller
132 Carrier
134 Slide
152, 154 Connections
412 Rotatable carrier
414 Feeding device
420 Gripping clamp
440 Tempering unit
444, 446 Contacting devices
O Opening movement
B Feeding movement
R Radial direction
L Longitudinal direction

The invention claimed is:

1. A temperature varying device for varying the temperature of plastic preforms, wherein said temperature varying device has at least one temperature varying unit arranged on a carrier which is rotatable about a predefined axis of rotation, and said temperature varying unit has at least two contacting devices which are suitable and intended for contacting an outer wall of the plastic preforms and between which at least one section of the plastic preforms can be received, and having a drive device for moving the at least two contacting devices in a predefined movement direction, wherein the apparatus has a detector for detecting at least intermittently a position of at least one of the at least two contacting devices in the predefined movement direction.

2. The apparatus according to claim 1, wherein a plurality of temperature varying units are arranged on the carrier and each temperature varying unit has a detector for detecting at least intermittently a position of the at least one contacting device in the predefined movement direction.

3. The apparatus according to claim 2, wherein the apparatus has a controller for controlling and or regulating the drive device as a function of the detected position of the at least one contacting device.

4. The apparatus according to claim 1, wherein the drive device is a pneumatic drive device.

5. The apparatus according to claim 1, wherein the detector has a proximity sensing device.

6. The apparatus according to claim 1, wherein the apparatus has a time measuring device.

7. The apparatus according to claim 6, wherein the time measuring device is suitable and intended for detecting a time interval between a first signal, which is characteristic of the actuation of the drive device, and a second signal, which is characteristic of a position of the contacting device.

8. A method for treating containers, wherein a plurality of substantially identical treatment stations are provided which treat the containers in a substantially identical manner by at least one treatment element, and wherein in each case the at least one treatment element is moved relative to the container to be treated by pneumatic drives which are assigned to the individual treatment stations, wherein at least one value which is characteristic of a geometric position of the at least one treatment element relative to the container is detected by a detection device, and/or wherein a first time value is also determined which is characteristic of a reaching of said geometric position of the treatment element and the pneumatic drive is controlled and/or regulated on the basis of said time value.

9. The method according to claim 8, wherein said time values are measured for multiple treatment stations and the pneumatic drives of the individual treatment stations are controlled in such a way that treatment times of the containers by the treatment elements for the individual treatment stations are equalized with one another.

10. The method according to claim 8, wherein a switching point of at least one valve of the pneumatic drive device is controlled and/or regulated.

11. The method according to claim 8, wherein the treatment element is a contacting device which makes contact with a plastic preform in order to vary the temperature thereof.

* * * * *